United States Patent
Heen et al.

(10) Patent No.: US 9,530,170 B2
(45) Date of Patent: *Dec. 27, 2016

(54) USER DEVICE, A SECOND SCREEN SYSTEM AND A METHOD FOR RENDERING SECOND SCREEN INFORMATION ON A SECOND SCREEN

(71) Applicant: THOMSON LICENSING, Issy de Moulineaux (FR)

(72) Inventors: Olivier Heen, Domloup (FR); Frederic Lefebvre, Rennes (FR)

(73) Assignee: Thomson Licensing (FR)

( * ) Notice: Subject to any disclaimer, the term of this patent is extended or adjusted under 35 U.S.C. 154(b) by 159 days.

This patent is subject to a terminal disclaimer.

(21) Appl. No.: 13/953,837

(22) Filed: Jul. 30, 2013

(65) Prior Publication Data

US 2014/0037132 A1    Feb. 6, 2014

(30) Foreign Application Priority Data

Aug. 1, 2012  (EP) .................................... 12305946

(51) Int. Cl.
| | |
|---|---|
| H04N 21/8358 | (2011.01) |
| G06T 1/00 | (2006.01) |
| H04N 21/41 | (2011.01) |
| H04N 21/44 | (2011.01) |
| H04N 21/4722 | (2011.01) |
| H04N 21/858 | (2011.01) |

(52) U.S. Cl.
CPC ......... *G06T 1/0021* (2013.01); *H04N 21/4122* (2013.01); *H04N 21/44008* (2013.01); *H04N 21/4722* (2013.01); *H04N 21/8358* (2013.01); *H04N 21/8586* (2013.01)

(58) Field of Classification Search
USPC ..................... 382/100, 202; 713/176; 726/26
See application file for complete search history.

(56) References Cited

U.S. PATENT DOCUMENTS

| | | | |
|---|---|---|---|
| 7,903,751 B2 | 3/2011 | Fiesel et al. | |
| 8,027,520 B2 | 9/2011 | Rhoads | |
| 8,914,346 B1 * | 12/2014 | Kim | ........................ G06F 17/30 707/705 |
| 2002/0090114 A1 | 7/2002 | Rhoads et al. | |

(Continued)

FOREIGN PATENT DOCUMENTS

| | | |
|---|---|---|
| WO | WO-03044735 | 5/2003 |
| WO | WO-2012049223 | 4/2012 |

*Primary Examiner* — Sayed Beheshti Shirazi
(74) *Attorney, Agent, or Firm* — Jack Schwartz & Associates, PLLC

(57) ABSTRACT

Rendering second screen information on a second screen device. A user device receives information characterizing the source of a content data stream and the content data stream; generates a watermark payload using a plurality of parameters comprising the information and a time of the user device; and inserts a watermark comprising the watermark payload into the content data stream that is rendered. The second screen device captures the watermark and extracts the watermark payload and then at least one of the plurality of parameters; generates, using the at least one extracted parameter, a request that is sent the request to a server; receives information from the server in response to the request; and displays the received information on a screen of the second screen.

8 Claims, 2 Drawing Sheets

(56) References Cited

U.S. PATENT DOCUMENTS

| | | | |
|---|---|---|---|
| 2002/0150165 A1* | 10/2002 | Huizer | G06Q 30/06 375/240.25 |
| 2005/0039020 A1* | 2/2005 | Levy | G06T 1/0071 713/176 |
| 2009/0150676 A1* | 6/2009 | Chen | G06T 1/0021 713/176 |
| 2009/0217052 A1 | 8/2009 | Baudry et al. | |
| 2010/0100581 A1 | 4/2010 | Landow et al. | |
| 2010/0240297 A1* | 9/2010 | Jones | H04N 21/6582 455/2.01 |
| 2010/0317399 A1* | 12/2010 | Rodriguez | H04M 1/0272 455/556.1 |
| 2011/0188700 A1* | 8/2011 | Kim | H04N 5/913 382/100 |
| 2011/0289532 A1* | 11/2011 | Yu | H04N 21/4126 725/38 |
| 2012/0166907 A1* | 6/2012 | Grube | G06F 21/62 714/755 |
| 2012/0272327 A1* | 10/2012 | Shin | G06F 21/16 726/26 |
| 2012/0315014 A1* | 12/2012 | Shuster | G06F 17/30817 386/241 |
| 2013/0236046 A1* | 9/2013 | Nallusamy | G06F 21/16 382/100 |

* cited by examiner

USER DEVICE, A SECOND SCREEN SYSTEM AND A METHOD FOR RENDERING SECOND SCREEN INFORMATION ON A SECOND SCREEN

This application claims the benefit, under 35 U.S.C. §119 of European Patent Application 12305946.1, filed Aug. 1, 2012.

TECHNICAL FIELD

The present invention relates generally to digital content delivery, and in particular to controlling access to digital content.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The so-called 'second screen' is becoming more and more widespread. It may be said to be an auxiliary electronic device such as a tablet or a smartphone that interacts with, usually, a television ('main screen') in order to provide interactivity with or additional information to the content displayed on the main screen. An example is showing a baseball game on the main screen and player statistics on the second screen. Another example is an interactive quiz show where answers to questions presented on the main screen may be entered using the second screen so that the spectator may participate in the game.

It will be appreciated that there is a need for synchronization between the content displayed on the main screen and the content displayed on the second screen, in particular when it comes to live content.

So far, three main techniques have been used to provide the synchronization: metadata, fingerprinting and watermarking.

In the metadata technique, the broadcaster embeds metadata in the video data stream. At the user's premises, the video data stream is separated from the metadata by e.g. the main screen itself or a Set-Top Box (STB). The main screen thus receives and renders the video data stream, while the metadata is sent to the second screen, which uses part of the metadata for synchronization of the rest of the metadata with the video data stream. A drawback of this technique is the need for a connection between the device that separates and sends the metadata and the second screen.

In the fingerprinting technique, the video data stream is sent to the main screen where it is rendered. The second screen captures at least part of the rendered content, preferably the audio, and computes audio fingerprints, so-called "DNA" fingerprints. The second screen then sends the DNA fingerprints to a special server that computes (or receives from the broadcasters) DNA fingerprints for a plurality of channels and compares the DNA fingerprint received from the second screen with its own DNA fingerprints. When there is a match, the server returns the channel and the time to the second screen. Drawbacks with this solution is that the architecture is rather complex and costly (it is time and resource consuming). In addition, the server cannot tell the difference between two channels that broadcast the same content.

In the watermarking technique, the broadcaster inserts a watermark in the audio part of the video data stream. The watermark uniquely identifies the time and the channel. When the main screen renders the content, the second screen is able to capture the audio, extract the watermark and obtain the time and the channel. A drawback is that the broadcaster has to watermark the content, which is not always desired since it requires a modification to the content workflow and since the watermark may have a cost (performance, license, audio quality, etc.).

It will thus be appreciated that there is a need for a solution provides an improved technique for synchronization between a main screen and a second screen. The present invention provides such a solution.

SUMMARY OF INVENTION

In a first aspect, the invention is directed to a user device configured for use in a second screen system. The user device comprises a processor configured to: receive a content data stream; generate a watermark payload using a plurality of parameters, the parameters comprising at least one value characterizing the source of the content data stream and user information; insert a watermark comprising the watermark payload into the content data stream to obtain a watermarked content data stream; and output the watermarked content data stream.

In a first embodiment, the processor is configured to receive the at least one value characterizing the source of the content data stream.

In a second embodiment, a further parameter is a time of the user device.

In a third embodiment, the at least one value characterizing the source of the content data stream comprises at least one of a channel, a content identifier, an identifier of the broadcaster, an identifier of the content owner, content rating information and a URL redirection.

In a fourth embodiment, the user information comprises at least one of a user identifier and user preferences. It is advantageous that the user identifier comprises at least one of an identifier of a user, an identifier of the user device and an identifier of a subscription.

In a fifth embodiment, the user device further comprises a rendering device configured to render the watermarked content data stream.

In a second embodiment, the invention is directed to a second screen system comprising the user device of the first aspect, a rendering device for rendering the watermarked content data stream and a second screen device that comprises: a screen; an interface for capturing the watermark from the rendered watermarked content data stream; and a processor configured to: extract the watermark payload from the captured watermark; extract at least one of the plurality of parameters from the watermark payload; generate, using the at least one extracted parameter, a request; send the request to a server; receive information from the server in response to the request; and display the received information on the screen.

In a first embodiment, the user device and the second screen device are located in a local network.

In a second embodiment, the processor of the user device is configured to generate and insert the watermark repeatedly.

In a third aspect, the invention is directed to a method for rendering second screen information on a second screen device in a second screen system. A user device receives a content data stream; generates a watermark payload using a plurality of parameters, the parameters comprising at least one value characterizing the source of the content data stream and user information; and inserts a watermark comprising the watermark payload into the content data stream to obtain a watermarked content data stream. The user device or a rendering device renders the watermarked content data stream. The second screen device captures the watermark from the rendered watermarked content data stream; extracts the watermark payload from the captured watermark; extracts at least one of the plurality of parameters from the watermark payload; generates, using the at least one extracted parameter, a request; sends the request to a server; receives information from the server in response to the request; and displays the received information on a screen of the second screen.

In a first embodiment, the user device receives the at least one value characterizing the source of a content data stream.

In a second embodiment, a further parameter is a time of the user device.

In a third embodiment, the at least one value characterizing the source of the content data stream comprises at least one of a channel, a content identifier, an identifier of the broadcaster, an identifier of the content owner, content rating information and a URL redirection.

In a fourth embodiment, the user information comprises at least one of a user identifier and user preferences.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
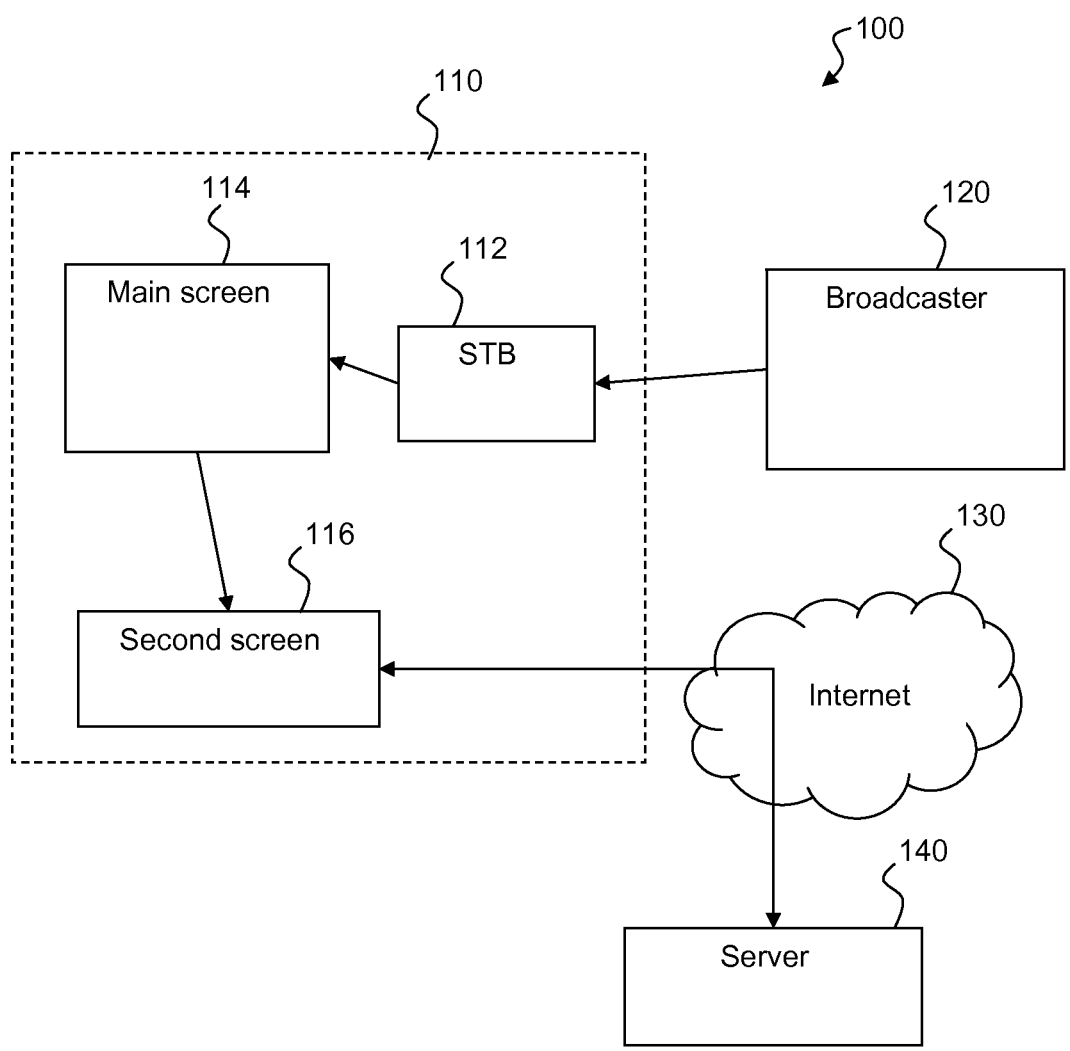
FIG. 1 illustrates a system according to a preferred embodiment of the present invention is used.

FIG. 1 illustrates a system 100 according to a preferred embodiment of the present invention. The system 100 comprises a broadcaster 120 that broadcasts (video) content in a data stream. The content is received by a first user device 112 (such as for example a Set-Top Box, STB). The first user device 112 usually first processes and then forwards the content to a main screen 114 where the content is rendered. A second screen 116 is configured to capture at least part, preferably the audio, of the content when it is rendered by the main screen 114. The first user device 112, the main screen 114 and the second screen 116 are usually comprised in a local network 110, for instance a home network.

The first user device 112, the main screen 114 and the second screen 116 are commonly located in a user's home, although they are not necessarily co-located. The second screen 116 should somehow be able to capture part of the content rendered by the main screen 114.

The system 100 further comprises a network 130, advantageously the Internet, and a server 140.

It will be appreciated that the entities in the network 100 each comprise the necessary components for proper functioning, software and hardware such as for example at least one processor, memory and interfaces, but these will not be described in detail as they are well known to the skilled person.

It will also be appreciated that the first user device 112 in alternate embodiments may be a gateway, a personal video recorder (PVR), a Set-Top Box (STB), a connected TV, game console or a computer, and that its functionality may even be incorporated in the main screen 114.

A main idea of the present invention is that the first user device 112 inserts a watermark into the content when the content is processed. This may be done when the content is rendered (e.g. by a STB), when it is stored for possible future rendering (e.g. by a PVR) or when it is transferred (by e.g. a gateway). The payload of the watermark comprises a value that preferably depends on at least three parameters:

A value α received prior to the rendering of the content. The value α is a set of values that characterize the source including information such as the channel, a content identifier (e.g. a ShowView code, a title or a hash value), an identifier of the broadcaster, an identifier of the content owner and content rating information, but a may also be a URL redirection like "bit.ly/rLrNa6". The value α may be received in different ways, for example in a hidden frame at the beginning of the content or in a field of an Electronic Program Guide (EPG).

The time t of the first user device 112.

User information, which may be one or both of an identifier ID and user preferences. The identifier ID may be a direct identifier of the user, such as a name, or an indirect identifier, such an identifier of the first user device 112, for example a serial number or a subscription number. The identifier may in certain cases be shared by a plurality of first user devices 112. The user preferences may comprise confidential information related to the user, such as (parts of) the user's purchasing history, viewing habits, but they may also comprise non-confidential information such as the user's mood (input by the user).

The second screen 116 captures the watermark, as is known in the art, when it is rendered by the main screen 114 and extracts the payload and, preferably, the parameters.

Figure 2:
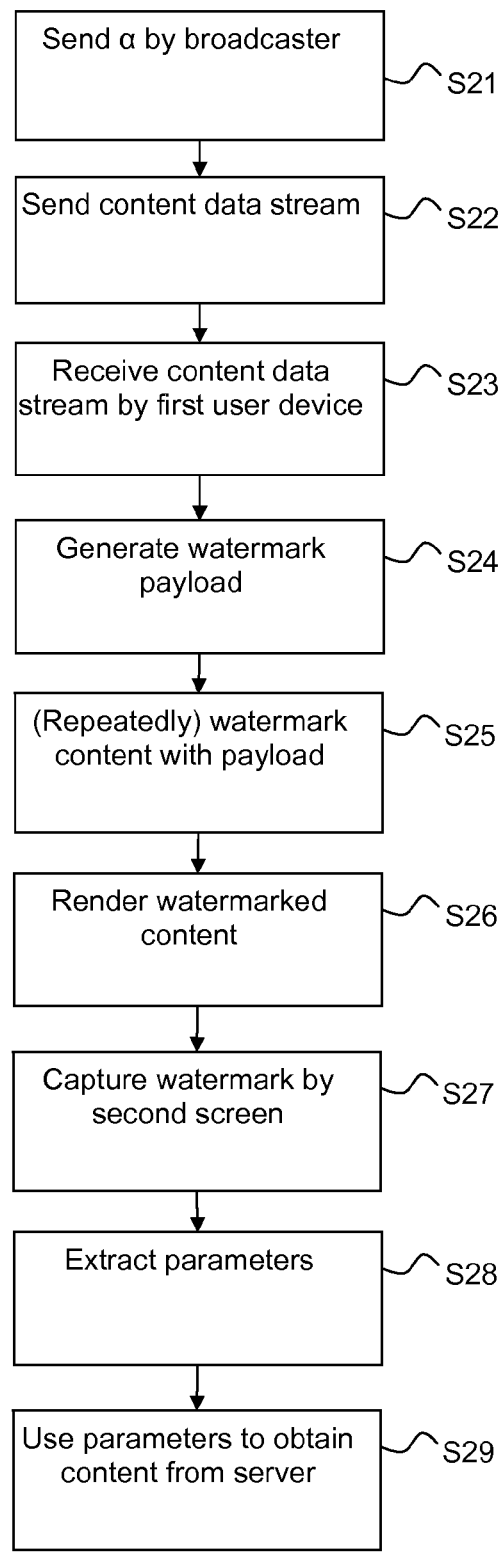
FIG. 2 illustrates a method for second screen synchronization according to a preferred embodiment of the present invention.

FIG. 2 illustrates a method for second screen synchronization according to a preferred embodiment of the present invention.

The broadcaster 120 sends S21 the value α to the first user device 112 in any suitable manner, e.g. as described hereinbefore. The broadcaster 120 also sends S22 the content data stream. The first user device 112 receives the value α and also receives S23 the content data stream, possibly together.

The first user device 112 generates S24 a watermark payload and inserts S25 the watermark into the content. The generation and insertion are preferably performed repeatedly in order to ensure a precise synchronization using the time t.

The main screen 114 renders S26 the watermarked content, that, as will be remembered, may be 'live' or recorded and the second screen 116 captures S27 the watermark, extracts S28 the parameters and uses S29 the parameters to retrieve, via the network 130, from the server 140 information that advantageously is related to the time t, the channel (based on α) and the user information. The request sent by the second screen 116 may also comprise further information such as an identifier of the second screen, the time the first user device 112 received the content or a quiz show answer. A typical request sent to the server is:

http://second-screen/?login=id&channel=α&time=t

In case the first user device 112 generates the watermark repeatedly (where the watermarks preferably have different times), it is preferred that the second screen 116 continuously captures the watermarks and uses the most recent parameters to generate the request.

The response to the request may be a commercial, sports statistics, a different scene or a scene viewed from a different angle (chosen by the user), a given number of points depending on the correctness of the quiz show answer.

The second screen 116 the preferably displays the response on its screen.

It will be appreciated that e.g. the commercial may be linked to the channel, the time and/or the identifier, but not necessarily to the content.

It will be appreciated that the present invention provides a solution that can allow second screen synchronization, not just for recorded content but also for live content.

The synchronization can also be personalised, as it is possible to identify the main screen and/or the second screen. This can for example allow extra bonuses related to the renderer identifier. It can also be possible to adapt the content for the second screen to the type of the first user device; for instance, if a radio embeds the watermark, then the second screen may display more visual content than if the embedder also renders video.

It will further be appreciated that the watermark can be added when the content is rendered (e.g. when played back by a PVR), which means that the content retrieved by the second screen can be made to depend on the reception time of the content at the first user device and/or of the rendering time.

It will also be appreciated that the invention can be made compatible with solutions where the content is watermarked by the broadcaster, as the watermark detection method at the second screen can be the same. Further, the invention can be implemented without further load on the broadcasting servers.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A second screen device for obtaining information from a rendered watermarked content data stream comprising:
   an interface for capturing a watermark repeatedly generated and inserted by a user device using a time of the user device from the rendered watermarked content data stream; and
   a processor configured to:
   extract a watermark payload from the captured watermark, the watermark payload comprising a plurality of parameters, the parameters comprising a value characterizing the source of the content data stream, a time of the user device and user information;
   extract the plurality of parameters from the watermark payload;
   repeatedly generate, using the extracted parameters, a request;
   send the request to a server;
   receive information related to an updated watermark payload generated by the user device using said time of the user device from the server in response to the request; wherein said updated watermark payload synchronizes the second screen with the user device using the time of the user device;
   provide the received information to a screen for rendering.

2. The second screen device of claim 1, wherein the at least one value characterizing the source of the content data stream comprises at least one of a channel, a content identifier, an identifier of the broadcaster, an identifier of the content owner, content rating information and a URL redirection.

3. The second screen device of claim 1, wherein the user information comprises at least one of a user identifier and user preferences.

4. The second screen device of claim 3, wherein the user identifier comprises at least one of an identifier of a user, an identifier of the user device and an identifier of a subscription.

5. A method for rendering second screen information on a second screen device, the method comprising:
   at the second screen device:
      capturing a watermark repeatedly generated and inserted by a user device using a time of the user device from a watermarked content data stream rendered by the user device;
      extracting a watermark payload from the captured watermark, the watermark payload comprising a plurality of parameters, the parameters comprising a value characterizing the source of the content data stream, a time of the user device and user information;
      extracting the plurality of parameters from the watermark payload;
      repeatedly generating, using the extracted parameters, a request;
      sending the request to a server;
      receiving information related to an updated watermark payload generated by the user device using said time of the user device from the server in response to the request;
   wherein said updated watermark payload synchronizes the second screen with the user device using the time of the user device; and
      providing the received information for rendering on a screen.

6. The method of claim 5, wherein the at least one value characterizing the source of the content data stream comprises at least one of a channel, a content identifier, an identifier of the broadcaster, an identifier of the content owner, content rating information and a URL redirection.

7. The method of claim 5, wherein the user information comprises at least one of a user identifier and user preferences.

8. The method of claim 7, wherein the user identifier comprises at least one of an identifier of a user, an identifier of the user device and an identifier of a subscription.

* * * * *